(12) United States Patent
Kuroki

(10) Patent No.: US 7,826,082 B2
(45) Date of Patent: Nov. 2, 2010

(54) OUTPUT PROCESSING DEVICE AND OUTPUT PROCESSING METHOD FOR EXECUTING PRINT AND COMMUNICATION OPERATIONS IN ACCORDANCE WITH REPLY DATA SENT FROM AN EXTERNAL DEVICE IN RESPONSE TO CREATED PRINT INSTRUCTION DATA DISTRIBUTED THERETO

(75) Inventor: Jun Kuroki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1105 days.

(21) Appl. No.: 11/440,949

(22) Filed: May 25, 2006

(65) Prior Publication Data

US 2007/0206213 A1    Sep. 6, 2007

(30) Foreign Application Priority Data

Mar. 2, 2006    (JP)    ............................. 2006-027037

(51) Int. Cl.
G06F 3/12    (2006.01)
G06K 15/00    (2006.01)
(52) U.S. Cl. .................................... 358/1.15; 358/1.16
(58) Field of Classification Search .................. 358/1.1, 358/1.9, 1.13, 1.15, 474, 400, 448, 1.16
See application file for complete search history.

(56) References Cited

U.S. PATENT DOCUMENTS 7,271,922 B2 * 9/2007 Yamashita ................... 358/1.1
2007/0070375 A1 * 3/2007 Owen ......................... 358/1.13
2009/0237732 A1 * 9/2009 Kuroda et al. .............. 358/1.15

FOREIGN PATENT DOCUMENTS

| JP | 2001-216101 A | 8/2001 |
| JP | 2001-249776 A | 9/2001 |
| JP | 2004-110116 A | 4/2004 |
| JP | 2004-199456 A | 7/2004 |
| JP | 2004-326817 A | 11/2004 |
| JP | 2005-275544 A | 10/2005 |

OTHER PUBLICATIONS

Japanese Office Action (and English translation thereof) dated Sep. 2, 2008, issued in a counterpart Japanese Application.

* cited by examiner

Primary Examiner—Gabriel I Garcia
(74) Attorney, Agent, or Firm—Holtz, Holtz, Goodman & Chick, PC

(57) ABSTRACT

An output processing device includes a communication section for communicating with an external device such as a user terminal, an output section for executing a printout of stored data, and a controller which controls printing and communication operations. The controller of the output processing device creates print instruction data, which it distributes to the external device. When reply data including a quote of the distributed print instruction data is received from the external device, the controller controls the output processing device to perform printout operations of the stored data and/or communication operations in accordance with the reply data received from the external device. Instruction data for controlling print operations and managing the stored data can be added to the reply data at the external device, and the output processing device performs operations in accordance with the reply data and any instruction data added thereto.

10 Claims, 9 Drawing Sheets

OUTPUT PROCESSING DEVICE AND OUTPUT PROCESSING METHOD FOR EXECUTING PRINT AND COMMUNICATION OPERATIONS IN ACCORDANCE WITH REPLY DATA SENT FROM AN EXTERNAL DEVICE IN RESPONSE TO CREATED PRINT INSTRUCTION DATA DISTRIBUTED THERETO

BACKGROUND OF THE INVENTION

1. Field of the Invention

The present invention relates to an output processing device and an output processing method for executing printout of stored data.

2. Description of Related Art

There is widely used an output processing device such as a printer or copier for receiving output object data from a user terminal connected through a network and for printing out the data. These output processing devices include a device capable of transmitting and receiving e-mails and a device capable of having memory for data storage to store output object data.

When print documents such as conference documents obtained by such an output processing device are shared among a plurality of persons, the sharing is conventionally realized by the following method.

(1) A document maker prints out the documents as many as the number of conference participants and distributes the documents, (2) a document maker transmits the data to the conference participants by e-mail, (3) a document maker stores (uploads) the data in a shared server and informs the conference participants of access information to the storage destination, and (4) a document maker stores electronic data in a memory of the output processing device as a print job and informs the conference participants of the print job name.

However, in the above-described (1) method, the document maker must perform the printing for all the conference participants to distribute the printed papers and therefore, has a heavy workload. Further, when the number of the conference participants is not specified, excess and shortage are caused in the number of copies.

In the (2) and (3) methods, each of the conference participants executes a printing operation of electronic data attached to the received mail or of electronic data downloaded from the shared server. However, when a user terminal on the conference participant side has no application for opening the electronic data, no electronic data may be printed. Further, when an electronic data capacity is large, congestion of the communication line is incurred.

Further, in the (4) method, the data is directly secured in the output processing device for printing out the data. Therefore, the (4) method is excellent in terms of no data movement. However, an operation for the print instruction on the stored data must be executed from an operating section of the output processing device and therefore, the method is complicated. Moreover, when a large amount of other data is stored within the memory, it is difficult to execute data retrieval.

To cope with this problem, there is disclosed a system having a Web server function for providing stored data to an output processing device, in which the user terminal side can start the Web browser to confirm contents of each data stored in the output processing device and to execute the print instruction on desired stored data (see, e.g., Japanese Patent Application Publication Unexamined Nos. 2004-326817 and 2004-110116). According to the system, retrieval of the stored data is easy as well as the print instruction can be executed by remote control.

Further, there is also disclosed a system for transmitting a program for setting a password in stored data in a confidential printing to each user terminal by attaching it to e-mail, in which the user terminal side can start the program to execute a password setting processing on the stored data in an output processing device (see, e.g., Japanese Patent Application Publication Unexamined No. 2001-216101). In addition, there is also disclosed an output processing device which informs each user terminal of a deletion date on stored data by using e-mail (see, e.g., Japanese Patent Application Publication Unexamined No. 2004-199456).

However, in technologies described in Japanese Patent Application Publication Unexamined Nos. 2004-326817 and 2004-110116, the Web browser must be started. Further, a long time is required to execute exchange for display of stored data or for retrieval of output object stored data. Accordingly, these technologies are complicated. Further, for the browse using the Web browser, the stored data is converted into HTML data and as a result, a layout thereof may be different from that of the original data or degradation of the image quality may be incurred.

Further, according to a technology described in Japanese Patent Application Publication Unexamined No. 2001-216101, stored data is specified by e-mail and therefore, no retrieving operation of the stored data is required in the output processing device. However, a long time is also required to start a program for password setting or to execute the password setting. Further, setting of the password can be executed by remote control. However, print instructions must be executed from an operating section of the output processing device and therefore, this technology is similarly complicated.

SUMMARY

It is an object of the present invention to provide an output processing device capable of instantly and easily executing a print instruction on stored data.

To accomplish the above object, in accordance with an embodiment according to one aspect of the present invention, the output processing device comprises:

a communication section for executing communication with an external device;

an output section for executing printout of stored data; and a controller for creating data for transmitting to the external device, the data being print instruction data substituting a reply to the data for an instruction on print execution of the stored data, for allowing the communication section to distribute the print instruction data to the external device and for allowing the output section to execute printout based on the stored data in response to reception of reply data when the reply data to the distributed print instruction data is received through the communication section.

Preferably, the controller creates the print instruction data including at least specific data for specifying printout object stored data and instruction data for print instruction on the stored data, and when the reply data including the specific data and the instruction data for the print instruction is received, the controller allows the output section to execute the printout based on the stored data specified by the specific data in accordance with the instruction data for the print instruction.

Preferably, the device can set whether the print instruction data is distributed, and when it is set that the print instruction data is distributed, the controller executes distribution of the print instruction data.

Preferably, a distribution destination of the print instruction data can be specified, and the controller allows the communication section to distribute the print instruction data to a specified distribution destination.

Preferably, instruction data for setting a printing condition of the stored data can be added to the reply data, and when the reply data including the instruction data for setting the printing condition is received, the controller executes setting of the printing condition of the stored data in accordance with the instruction data for setting the printing condition.

Preferably, instruction data for deleting the stored data can be added to the reply data, and when the reply data including the instruction data for deleting the stored data is received, the controller executes deletion of the stored data in accordance with the instruction data for deleting the stored data.

BRIEF DESCRIPTION OF THE DRAWINGS

The present invention will become more fully understood from the detailed description given hereinafter and the accompanying drawings given by way of illustration only; and thus are not intended as a definition of the limits of the present invention, and wherein.

DETAILED DESCRIPTION OF PREFERRED EMBODIMENTS

Preferred embodiments according to an output processing device and output processing method of the present invention will be described below with reference to the drawings.

First, a configuration will be described.

Figure 1:
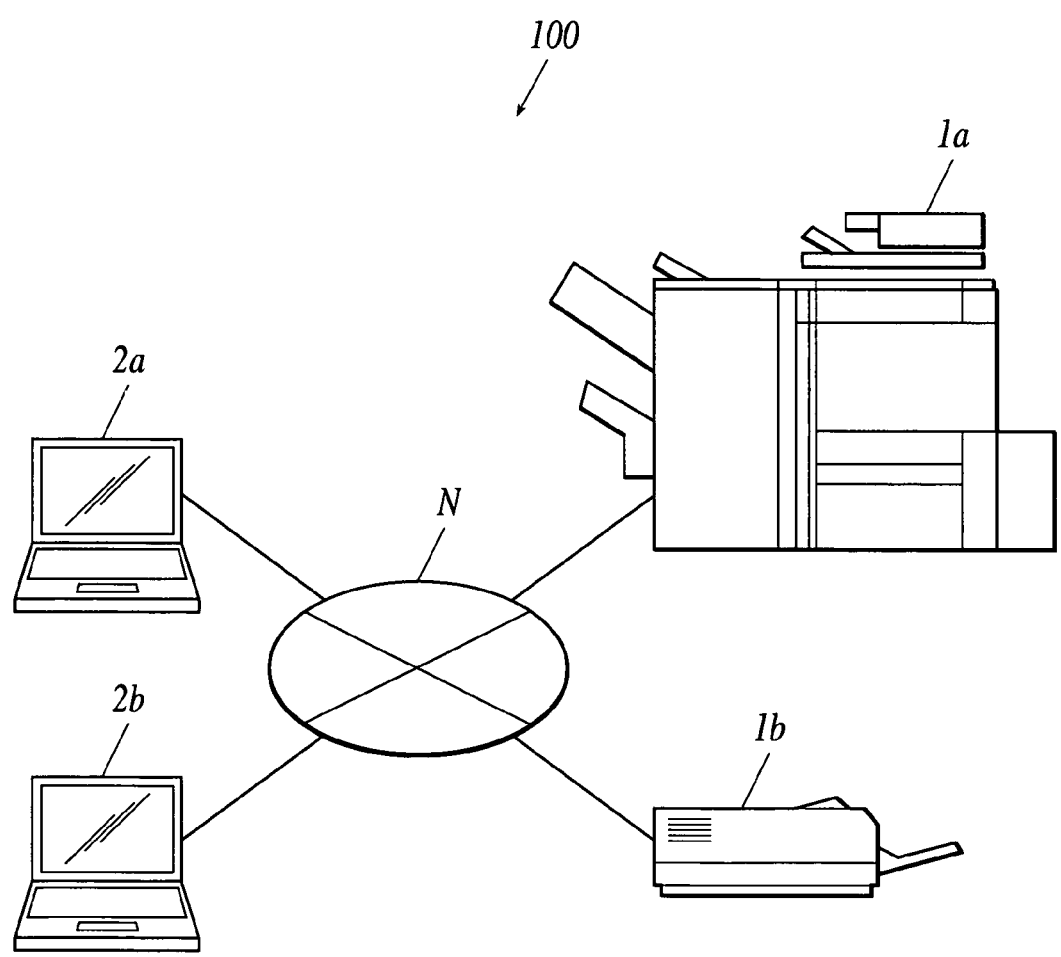
FIG. 1 is a view showing an output system including an output processing device according to the present embodiment.

FIG. 1 shows an output system 100 including the output processing device in the present embodiment.

As shown in FIG. 1, the output system 100 comprises output processing devices 1a and 1b, and user terminals 2a and 2b, in which the respective devices 1a, 1b, 2a and 2b are connected to each other through a network N.

The output system 100 is a system which executes printout based on the output object data received in the output processing devices 1a and 1b when output object data is transmitted from the user terminals 2a and 2b to the output processing devices 1a and 1b.

The respective devices 1a, 1b, 2a and 2b will be described below.

The output processing devices 1a and 1b are printers, copiers, facsimile machines or machines in combination thereof. These devices execute printout of data which is received under a print instruction from the user terminals 2a and 2b or of data which is read by a scanner.

Specific configurations of the output processing devices 1a and 1b will be described below. Since the output processing devices 1a and 1b have the same fundamental configuration, the output processing device 1a will be herein described by way of example.

Figure 2:
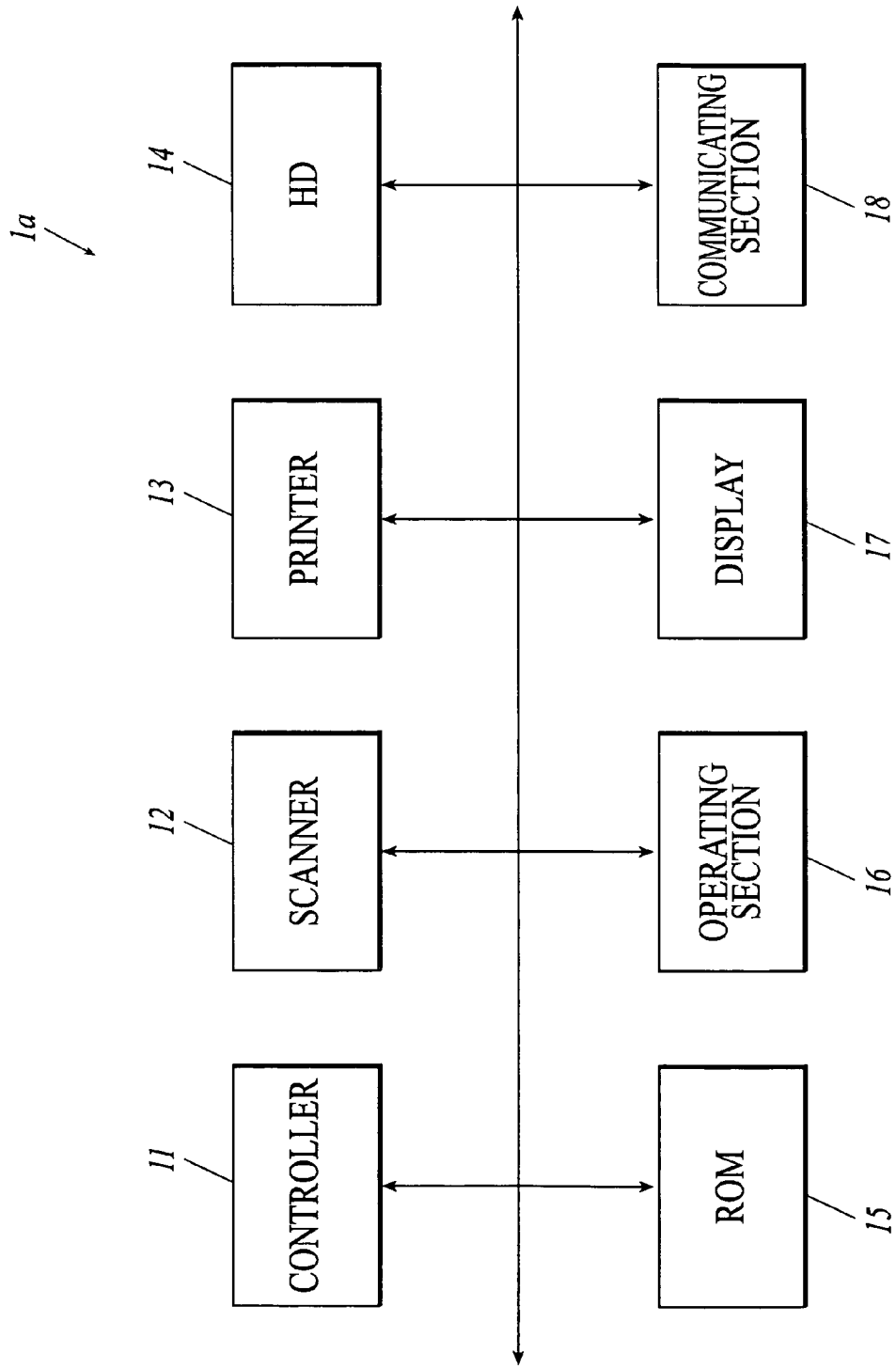
FIG. 2 is a view showing an internal configuration of an output processing device.

FIG. 2 is a view showing an internal configuration of the output processing device 1a.

As shown in FIG. 2, the output processing device 1a comprises a controller 11, a scanner 12, a printer 13, an HD (Hard Disk) 14, a ROM (Read Only Memory) 15, an operating section 16, a display 17 and a communicating section 18.

The controller 11 comprises a CPU (Central Processing Unit) and a RAM (Random Access Memory), in which various control programs or processing programs stored in the ROM 15 are read out and in accordance with these programs, various operations are executed or central control of operations of the respective sections 12 to 18 is executed.

For example, the controller 11 serves as a printer controller which controls a printout operation of the printer 13 in accordance with a print processing program and allows the printer 13 to execute printing based on the output object data.

Further, the controller 11 exerts a Web server function by the execution of a Web server program. This function is a function of providing an operating function for executing retrieval or print instruction on the stored data on the Web browser in the user terminals 2a and 2b.

The scanner 12 reads an image of a document face to generate the image data. The scanner 12 comprises a mirror set in which a light source for irradiating light onto a read object document and a mirror for receiving the reflected light and allowing the light to further reflect and enter an image pickup device are integrally formed, and an image pickup device such as a CCD (Charge Coupled Device) image sensor for executing photoelectric conversion.

During reading, a mirror unit is allowed to scan the original document to irradiate light onto the document surface, and the reflected light is received by the image pickup device and then subjected to photoelectric conversion. An image signal (analog) generated by photoelectric conversion is subjected to A/D conversion in a signal processor (not shown) and then outputted to the printer 13 or the HD 14 under the control of the controller 11.

The printer 13 executes printout based on the output object data inputted by the controller 11. A printing method of the printer 13 may be any method such as an electrophotographic method or an ink-jet method. Using, as an example, a case of adopting the electrophotographic method, a printing method of the printer 13 will be described. That is, the printer 13 has an exposure part, a development part and a fixing part. During the printout, the exposure part forms an electrostatic latent image on a printing paper based on the output object data and the development part blows toner onto the printing paper. The fixing part heats the printing paper having adhered thereon the toner to execute the fixing process of the toner and then outputs the printing paper.

The HD 14 is a high-capacity memory for storing the output object data.

The ROM 15 stores various control programs or processing programs which are executed by the controller 11, and parameters or data which is required for execution of the programs.

The operating section 16 has various function buttons such as a button for instructing printing and a button for setting printing conditions as well as a touch panel (operation panel) formed integrally with the display 17. The operating section 16 generates an operation signal corresponding to a depressed button and outputs the signal to the controller 11.

The display 17 has a display such as an LCD (Liquid Crystal Display). On this display, the display 17 displays various operation screens such as a print setting screen, or processing results of the controller 11.

The communicating section 18 has a communication interface such as a network interface card and executes data communication with external devices such as user terminals 2a and 2b on the network N. Further, when the output processing device 1a has a facsimile function, the section 18 has a FAX modem and executes facsimile communication.

To the user terminals 2a and 2b, a general information processing equipment such as a personal computer with a communication function can be applied. The user terminals 2a and 2b have various application programs for word processors or drawings, and can create text data or image data in accordance with these programs.

Further, the user terminals 2a and 2b have a program for a printer driver and can execute a print control operation on the output processing devices 1a and 1b through the execution of this program.

Figure 3:
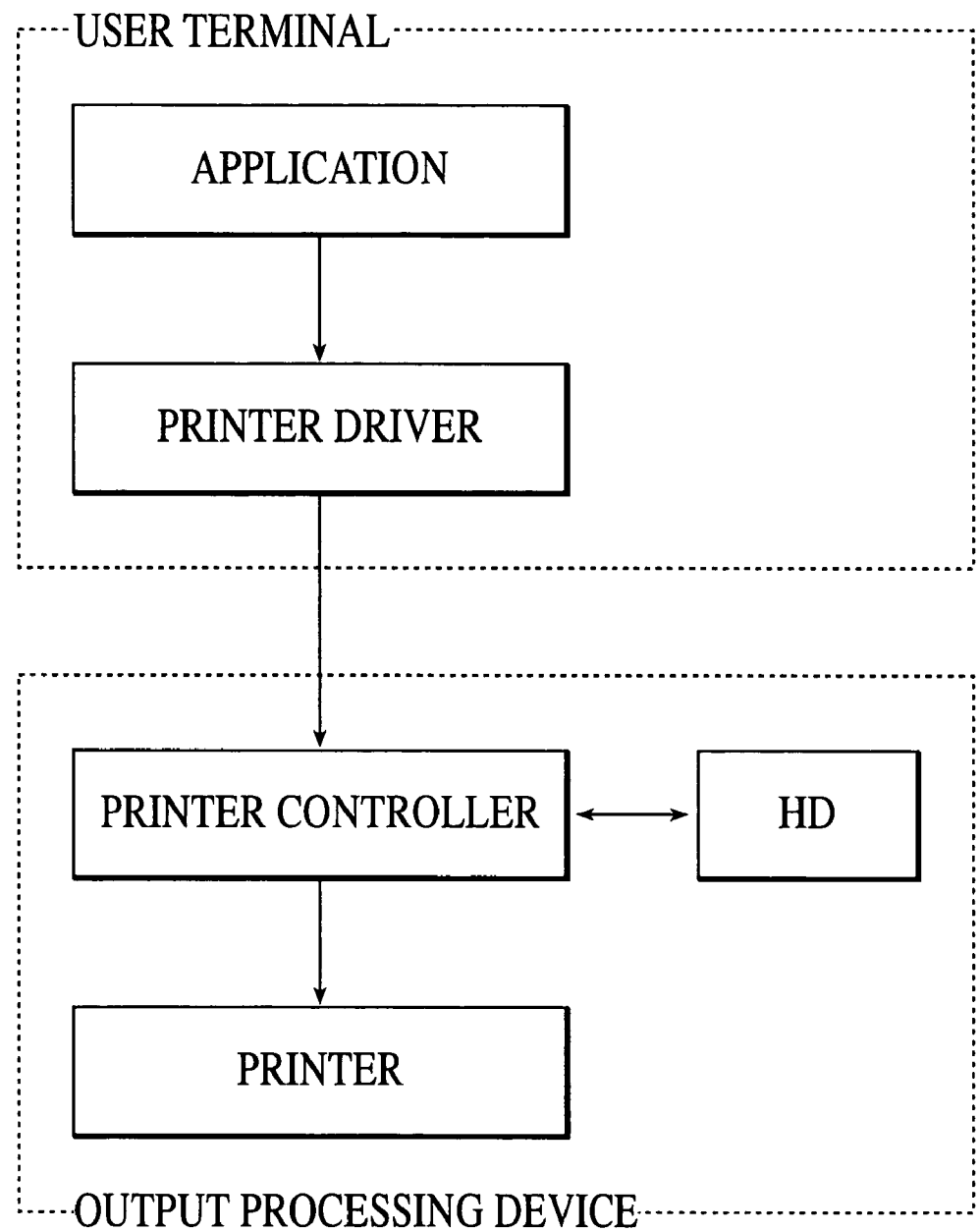
FIG. 3 is a view illustrating a flow from creation to output of data.

Generally, data created by the user terminals 2a and 2b is printed out by the output processing devices 1a and 1b as follows. As shown in FIG. 3, data created by application programs is outputted to the printer driver. By the printer driver, the output object data as well as setting data of printing conditions of the data is outputted, as a print job (referred to as collected printing requests), to a printer controller (controller 11) on the sides of the output processing devices 1a and 1b. In the printer controller (controller 11), when the storage of the data is instructed by the print job, the data is stored in the HD 14, whereas when printing of the data is instructed, the data is outputted to the printer 13.

Next, operations will be described.

Herein, a case of storing in the output processing device 1a text data created in the user terminal 2a to share the stored data among a plurality of users and to print out the stored data will be described by way of example.

First, a print setting processing on the output object text data is executed by the printer driver in the user terminal 2a. In the print setting processing, there are displayed setting screens such as a text data processing method (any one of printing and storage is selected), information as to whether print instruction data (print instruction data will be described later) is distributed in the case of storing the text data, instruction information such as a distribution destination in the case of distributing the print instruction data, a storage job name and a name of a user previously executing storage of the text data. Further, the setting is executed in response to operations in the setting screen.

When the setting is completed, the output object text data is converted into data in the PDL (Page Description Language) format by the printer driver. The data in the PDL format as well as the setting data are transmitted, as a print job, to the output processing device 1a.

Figure 4:
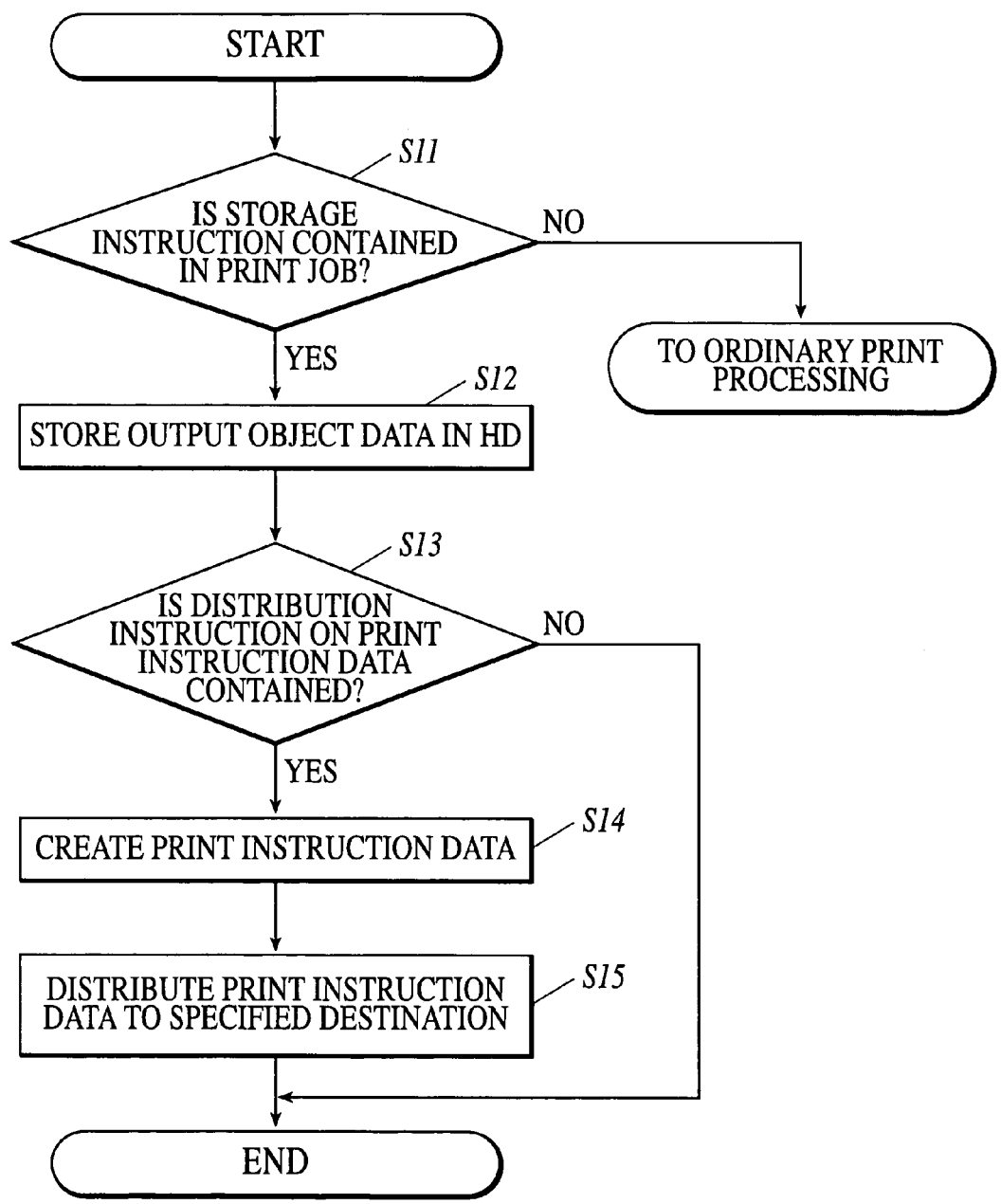
FIG. 4 is a flowchart showing a print job reception processing executed in an output processing device.

In the output processing device 1a, when the print job is received, a print job reception processing as shown in FIG. 4 is executed.

In the print job reception processing shown in FIG. 4, the controller 11 first analyzes the setting data contained in the print job and determines whether or not a storage instruction on the output object data is contained in the print job (step S11). When an instruction contained in the print job is not a storage instruction but a print instruction (step S11; N), the flow proceeds to a normal print processing.

On the other hand, when an instruction contained in the print job is a storage instruction on the output object data (step S11; Y), the output object data and the setting data are stored, as a storage job, in the HD 14 (step S12). At this time, a storage job ID (e.g., "JOB1") for individually identifying each storage job is given to the storage job, and the storage job and the storage job ID are correspondingly stored. Next, the controller 11 determines whether or not a distribution instruction on the print instruction data is contained in the storage job stored in the HD (step S13). When no distribution instruction is contained in the storage job, the processing is completed.

Further, when the distribution instruction on the print instruction data is contained in the storage job, the print instruction data is created in the controller 11 (step S14). The print instruction data is data for executing a print instruction on the output object data (hereinafter, referred to as stored data) stored in the HD 14 and is distributed to a specified destination. When receiving a return mail to the data, the return mail is substituted for an instruction on print execution of the stored data. The print instruction data contains at least specific data for specifying the storage job within the HD 14 and instruction data for the print instruction on the storage job.

The print instruction data is preferably all-purpose data such as mail data so as to be easily shared with any user terminal.

In the present embodiment, the following description will be executed on the assumption that the print instruction data is created as mail data (this is referred to as a print instruction mail).

Figure 5:
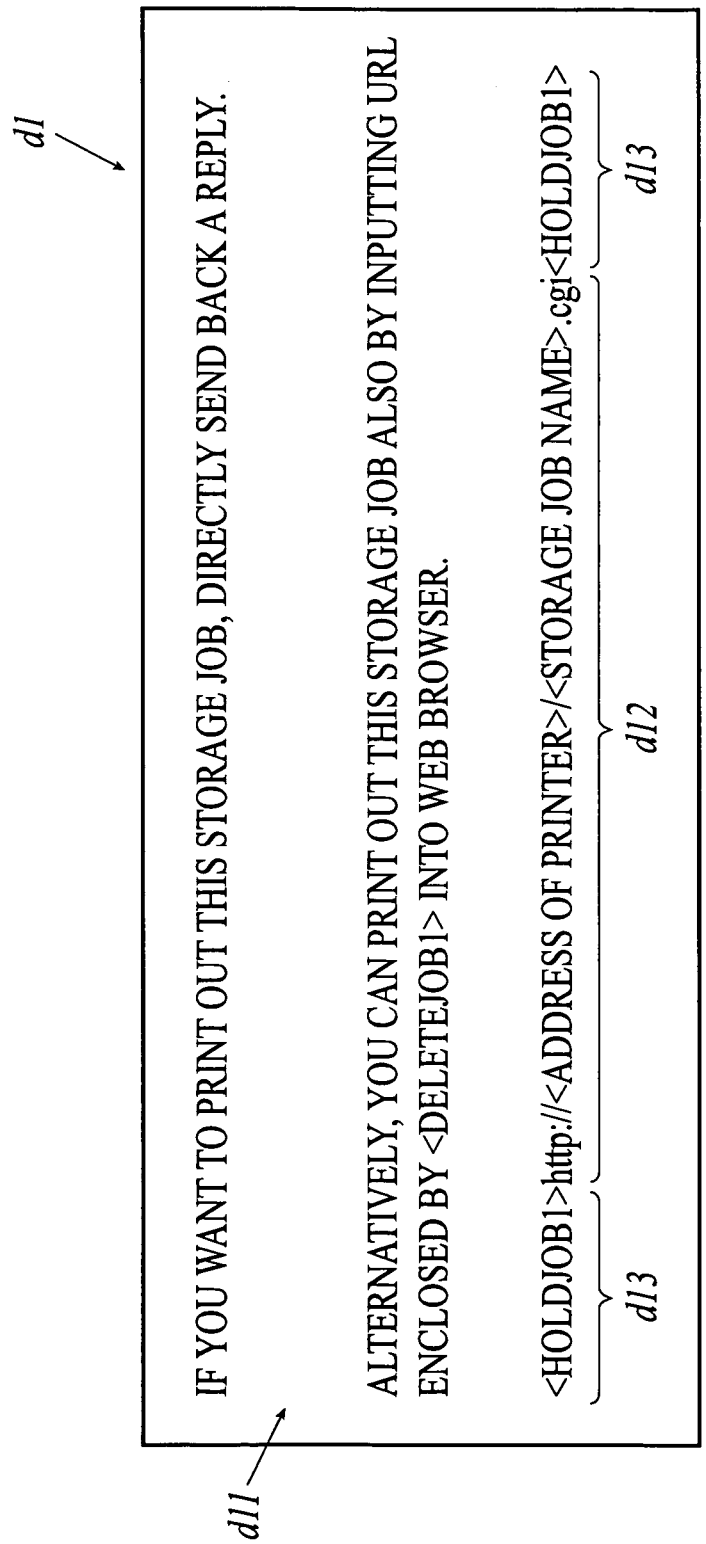
FIG. 5 is a view showing a display example based on print instruction data.

FIG. 5 shows one example of the print instruction mails.

A print instruction mail d1 shown in FIG. 5 is created so as to contain a print instruction key word d12 together with a comment d11 for describing a printing method of a storage job. The print instruction key word d12 is print instruction data comprising a URL showing a storage destination address within the HD 14 of the storage job, and each end of the key word d12 is enclosed by terminators d13. The terminator d13 is an identifier used for extracting the print instruction keyword d12. For the identifier, there is used "HOLDJOB1" showing that a keyword type to be extracted is the print instruction keyword d12. "JOB1" in "HOLDJOB1" is specific data for specifying a printout object storage job. Herein, the storage job ID is used.

In the controller 11, when such a print instruction mail is created, setting data of a destination (mail address) specified as a distribution destination of the print instruction mail is obtained from the storage job within the HD 14 and then, each of the print instruction mails is distributed to the relevant destination through the communicating section 18 (step S15). When accomplishing the distribution, the processing is completed.

For example, when the print instruction mail is distributed to the user terminal 2b, the print instruction mail is displayed in the user terminal 2b.

When printout of the storage job shown by the print instruction mail is executed, a user may execute the operation for creating a reply mail which quotes the print instruction mail and for transmitting the mail to the output processing device 1a. By the quote, the reply mail contains the print instruction keyword and the specific data.

Further, the print instruction mail may be further transferred to a user terminal of a different user. When similarly executing the printing of the storage job also in the transfer destination, a user may send back a reply mail to the output processing device 1a as a distribution source of the print instruction mail.

When sending back the reply mail, various instruction data for the storage job may be further added to the print instruction data and then the reply mail is sent back to the output processing device 1a.

Figure 6:
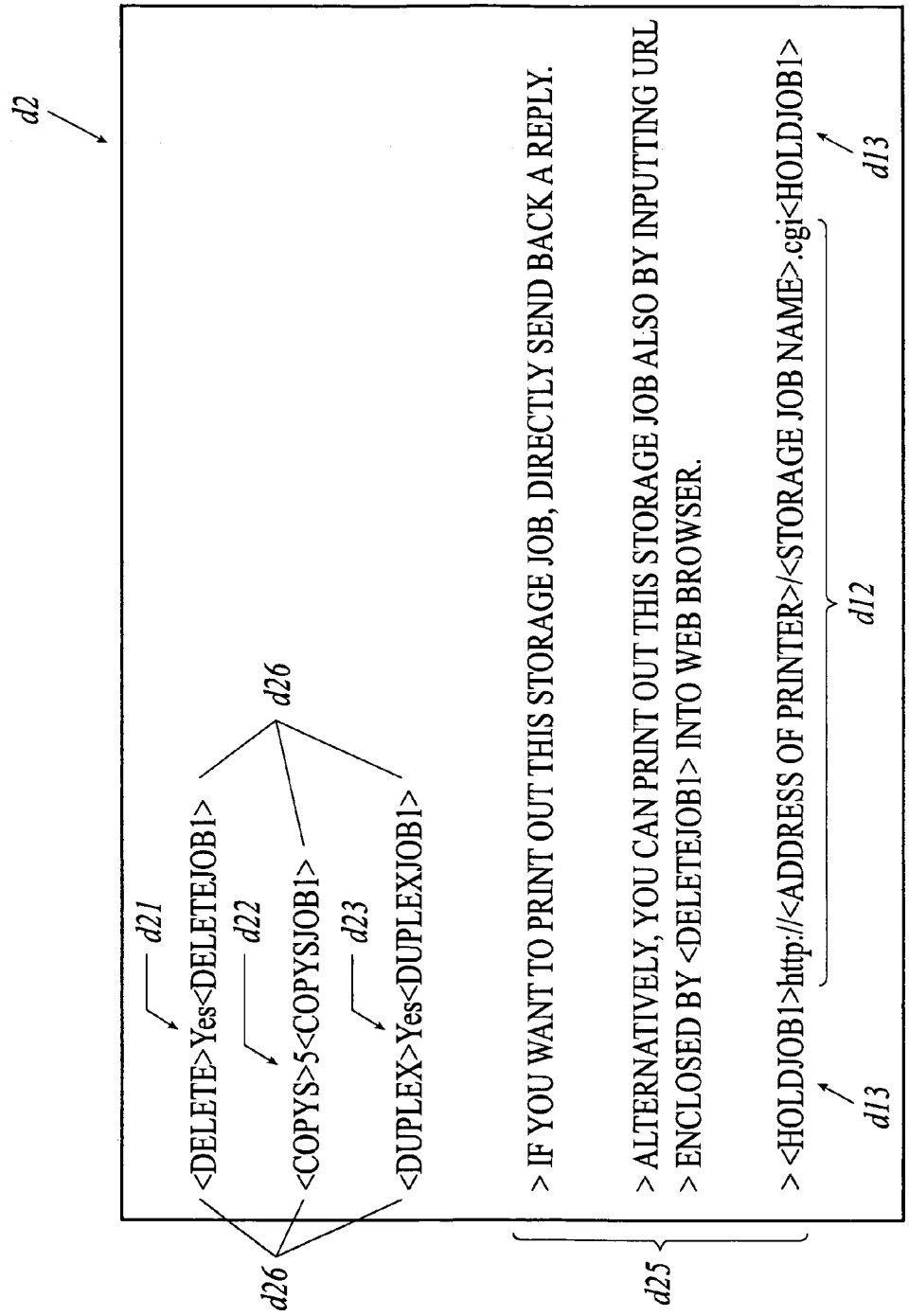
FIG. 6 is a view showing a display example of reply data to print instruction data.

For example, in a case of a reply mail to the print instruction mail d1 shown in FIG. 5, a deletion keyword d21 for instructing deletion of the storage job, a keyword d22 or d23 for instructing the setting of printing conditions of the storage job may be added to a quote d25 from the print instruction mail d1 as shown in FIG. 6. Herein, the keyword d22 is instruction data for the setting of the number of printings, and the keyword d23 is instruction data for the setting of double face printing. Further, the quote d25 contains a print instruction keyword d12.

When inputting the keywords d21 to d23, the keywords must be enclosed by terminators d26 in order to extract each of the keywords d21 to d23 in the output processing device 1a. In response to various keywords, a description method of the terminator d26 is previously set, such as "<DELETE>" in a case of the deletion keyword d21, "<COPYS>" in a case of the print setting keyword d22 of the number of printings and "<DUPLEX>" in a case of the print setting keyword d23 of double face printing.

In order to allow specification of storage job to be processed by the keyword, the terminator d26 must be formed using specific data of the storage job such as a storage job ID.

For example, in a case of the deletion keyword d21, a pair of the terminators "<DELETE>" is inputted to each adjacent side of the keyword d21 and further, the storage job ID "JOB1" which shows a deletion object storage job is added to the latter side terminator of the pair of terminators, thereby forming "<DELETEJOB1>", as shown in FIG. 6.

A keyword of a reply mail can be not only added but also deleted. Further, the keyword can be freely edited for any purpose. For example, in a case of executing only the print setting and executing no print instruction, there may be created a reply mail to which a print setting keyword is added and from which a print instruction keyword is deleted. Further, in a case where a print instruction mail is received for a plurality of storage jobs, keywords for the plurality of storage jobs may be described in one reply mail. Each of the storage jobs to be processed by the plurality of the described keywords can be specified by the storage job ID contained in the terminator, as described above.

Based on a reply instruction, the reply mail thus created in response to operations of a user is sent back from the user terminal 2a or 2b to the output processing device 1a as a distribution source of the print instruction mail.

In the output processing device 1a having received therein the reply mail, a keyword processing is executed.

The keyword processing executed in the output processing device 1a will be described below with reference to FIGS. 7, 8A and 8B.

Figure 7:
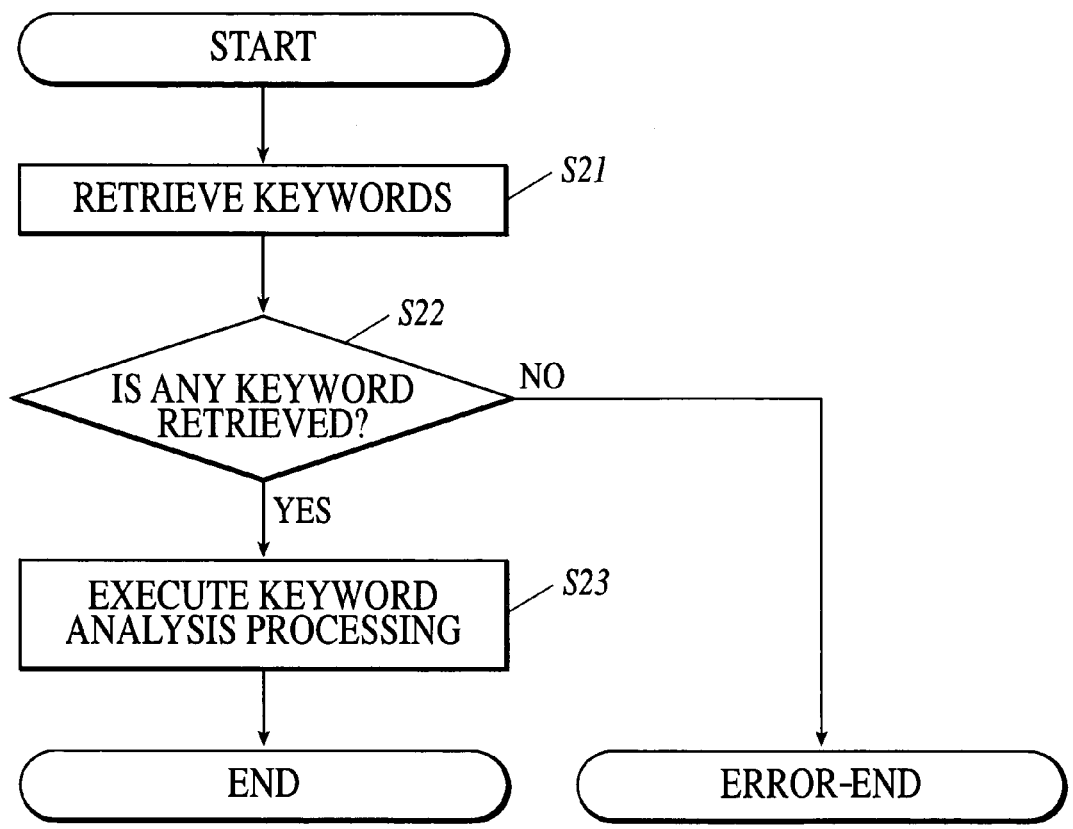
FIG. 7 is a flowchart showing a key word processing executed in an output processing device.

In the output processing device 1a, the controller 11 retrieves the keywords contained in the received reply mail as shown in FIG. 7 (step S21). The retrieval is executed by first detecting two corresponding terminators and then extracting the keyword enclosed by the pair of terminators. When no keyword is retrieved (step S22; N), the processing is completed by deciding that an error is caused. On the other hand, when any keyword is retrieved (step S22; Y), the flow proceeds to a keyword analysis processing in step S23.

The keyword analysis processing in step S23 will be described with reference to FIGS. 8A and 8B.

Figure 8A:
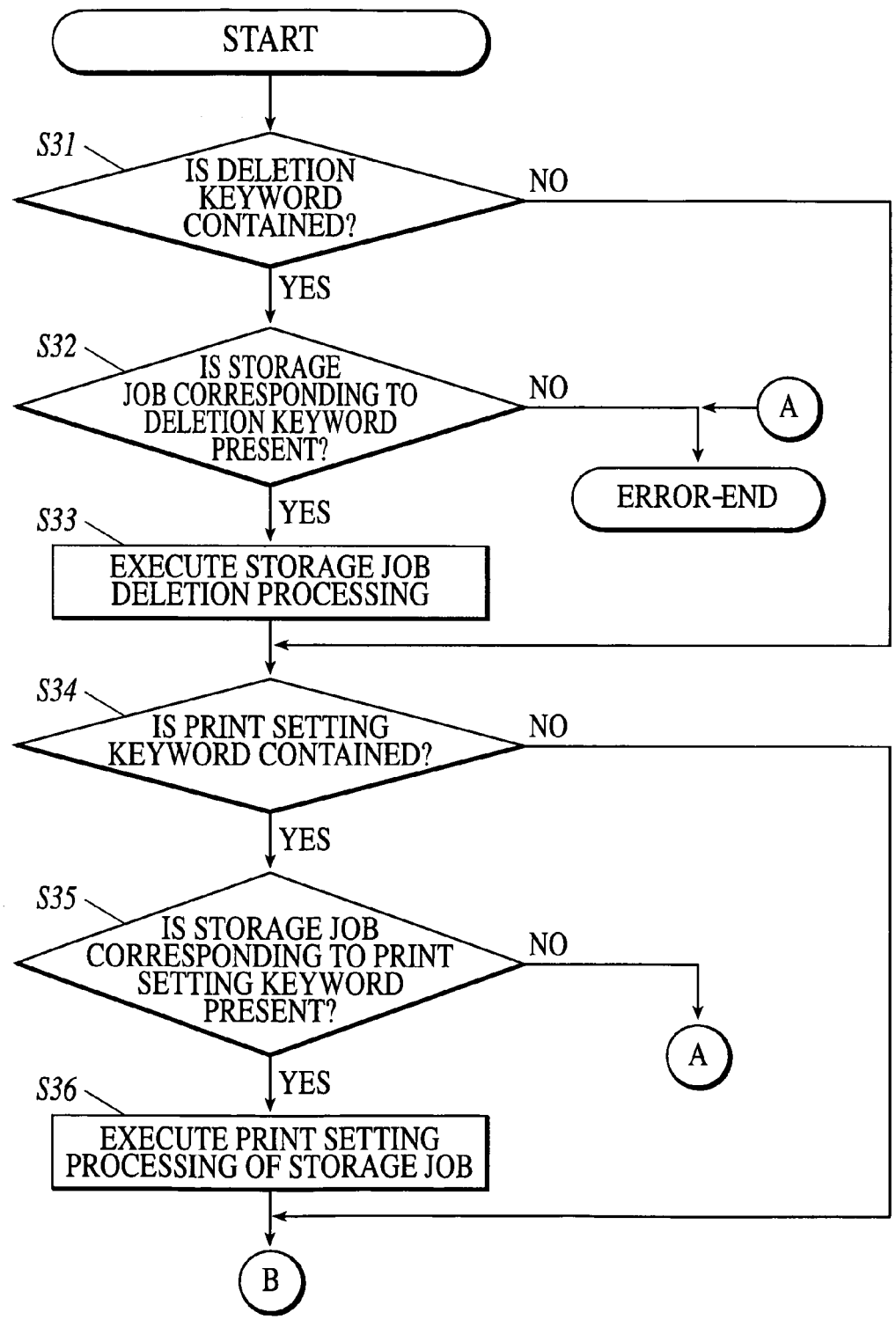
FIGS. 8A and 8B are a flowchart showing a key word processing executed in an output processing device.
Figure 8B:
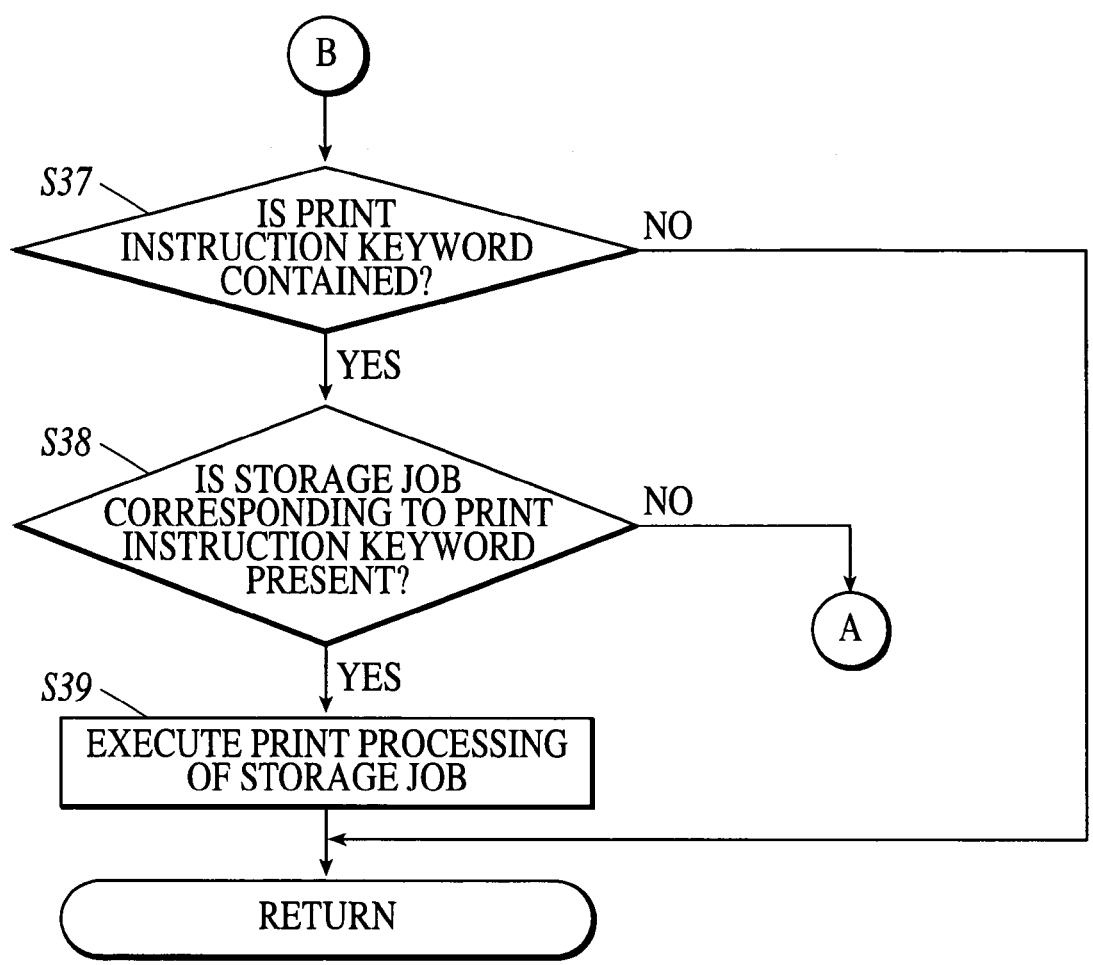

In the keyword analysis processing shown in FIGS. 8A and 8B, the controller 11 determines whether or not a deletion keyword is contained in a retrieved keyword (step S31). Determination of the keyword type is executed based on the terminator used in the extraction of the keyword. More specifically, in a case of the deletion keyword, a terminator thereof is "<DELETE>" and in a case of the print setting keyword, a terminator thereof is "<COPYS>" or "<DUPLEX>". Therefore, by referring to a terminator, a keyword type extracted by the terminator can be determined. As a result of the determination, when no deletion keyword is contained in retrieved keywords (step S31; N), the flow proceeds to step S34.

On the other hand, when a deletion keyword is contained (step S31; Y), the controller 11 determines the presence/absence of a storage job corresponding to the deletion keyword (step S32). A terminator contains a storage job ID of a storage job to be processed. In the example of the reply mail d2 shown in FIG. 6, the deletion object storage job ID "JOB1" is contained in the latter side terminator d26 "<DELETEJOB1>" of the pair of terminators d26 which encloses the deletion keyword d21. Accordingly, by obtaining a storage job ID with reference to a terminator and by retrieving within the HD 14 a storage job shown by the storage job ID, the presence/absence of the storage job can be determined.

As a result of the determination, when a storage job corresponding to a storage job ID is absent within the HD 14 (step S32; N), the processing is completed by deciding that an error is caused. When a storage job corresponding to a storage job ID is present within the HD 14 (step S32; Y), a deletion processing for deleting the storage job from the HD 14 is executed through data control of the controller 11 (step S33).

When the deletion processing of the storage job is completed, the controller 11 determines whether or not a print setting keyword is contained in a retrieved keyword (step S34). A determination method of the print setting keyword is the same as that of the deletion keyword. That is, determination of the keyword type is executed by the terminator used in the extraction of the keyword. In a case of the reply mail d2 shown in FIG. 6, the keyword d22 for the number of printings which is enclosed by the terminators d26 of <COPYS> and <COPYSJOB1>, and the keyword d23 for the double face printing which is enclosed by the terminators d26 of <DUPLEX> and <DUPLEXJOB1> are determined to be the print setting keywords.

When no print setting keyword is contained (step S34; N), the flow proceeds to step S37. On the other hand, when a print setting keyword is contained (step S34; Y), the controller 11 determines the presence/absence of the storage job corresponding to the print setting keyword (step S35). The determination of the presence/absence of the storage job is the same as that of the above-described deletion keyword and therefore, the description is herein omitted.

When a storage job corresponding to a print setting keyword is absent within the HD 14 (step S35; N), the processing is completed by deciding that an error is caused. On the other hand, when a storage job corresponding to a storage job ID is present within the HD 14 (step S35; Y), the print setting processing of the storage job is executed (step S36). Specifically, the controller 11 rewrites setting data of printing conditions contained in the storage job into that of the printing conditions instructed by the print setting keyword.

When the print setting processing of the storage job is completed, the controller 11 determines whether or not a print instruction keyword is contained in a retrieved keyword (step S37). In a case of the reply mail d2 shown in FIG. 6, the presence/absence of the print instruction keyword d12 which is enclosed by the pair of terminators d13 of <HOLDJOB1> is determined.

When no print instruction keyword is contained or when analysis of all the retrieved keywords is completed and any other keywords are not retrieved (step S37; N), the processing is completed. On the other hand, when the retrieved keyword is a print instruction keyword (step S37; Y), the controller 11 determines the presence/absence of the storage job corresponding to the print instruction keyword (step S38). The determination method is the same as that of the above-described deletion keyword and therefore, the description is omitted.

When a storage job corresponding to the print instruction keyword is absent (step S38; N), the processing is completed by deciding that an error is caused. When the storage job is present (step S38; Y), a print processing of the storage job is executed (step S39). Specifically, the controller 11 reads a storage job from the HD 14 and the printer 13 executes printout of stored data in accordance with setting data of printing conditions contained in the storage job. Then, after completion of the printout, the processing is completed.

As described above, according to the present embodiment, a print instruction mail for the stored data is created and then distributed to a specified destination as well as a printout is executed in response to a reply mail to the distributed mail. As a result, a user (distributor) who desires to distribute a printing of the stored data is allowed to easily distribute the printing to object persons. Further, a printout object stored data can be specified by the print instruction mail as well as just the reply mail to the print instruction mail can be substituted for print instruction on the stored data. Therefore, a receiver of the print instruction mail can easily and instantly execute a print output instruction on the desired stored data remotely.

According to conventional methods described in Japanese Patent Application Publication Unexamined Nos. 2004-326817 and 2004-110116, the print instruction on stored data through a Web browser can be executed by remote control; however, the stored data within the HD must be retrieved and confirmed to specify the printout object stored data and therefore, these methods are complicated. To the contrary, according to the present embodiment, the printout object stored data can be specified only by executing a reply operation to the print instruction mail, and therefore, retrieval and confirmation are unnecessary. In the retrieval of the stored data through a Web browser, exchanges with the output processing devices 1a and 1b must be executed and therefore, a time is required. However, in the present embodiment, such an operation can be omitted.

In addition, according to a method described in Japanese Patent Application Publication Unexamined No. 2001-216101, a mail which specifies stored data to be processed is distributed to a specified destination. In this method, a program attached to the mail must be started to execute a processing on the stored data and therefore, a time is required for the start of the program or for the processing operation in accordance with the program. According to the present embodiment, the print instruction can be executed only by a reply operation and as a result, an easy and instant response can be executed.

Further, it can be set whether the print instruction mail is distributed and therefore, the print instruction mail can be distributed only in a case of necessity such as in a case of sharing the stored data among a plurality of users.

In addition, when distributing the print instruction mail, the same print instruction can be executed not only in a user as a distribution destination but also in a user as a transfer destination and therefore, sharing of the stored data is easy.

Further, a distribution destination of the print instruction mail can be specified and therefore, the print instruction mail can be distributed only to a specified distribution destination.

Further, the print instruction as well as other instruction data such as a deletion keyword or a print setting keyword can be added to a reply mail, and a processing in accordance with this instruction data is executed in the output processing device 1a. Therefore, also the instruction on deletion or print setting can be easily and instantly executed remotely.

The above-described embodiment is a preferred example to which the present invention is applied, and the present invention is not limited to the embodiment.

In the above description, for example, a case of receiving from the user terminal 2a the print job for the output object data is described; however, the present invention is not limited to this case. The present invention can be applied also to output object data which is read from the scanner 12. In this case, there is taken a construction such that necessary setting such as setting as to whether the print instruction mail is distributed or setting of a distribution destination of the mail is executed from the operating section 16 of the output processing device 1a.

Further, when the deletion keyword, the print setting keyword and the print keyword are simultaneously contained in the reply mail, a processing is preferentially executed in the order of deletion, print setting and printing; however, a processing preferentially executed may be arbitrary set.

Further, the present invention can be applied also to stored data in which a password is set during storage. For example, a user who previously stores stored data informs of a set password a user (distribution object person) as a distribution destination of a print instruction mail. The distribution object person adds to the print instruction mail a keyword as a password which is enclosed by terminators for a password and then sends back the mail. The output processing device 1a executes a keyword analysis to extract a password and determines whether or not the password agrees with a password set in the stored data. Thereafter, when both of the passwords agree with each other, the device 1a executes the printout of the stored data. According to the construction, also the printout of the stored data in which a password is set can be easily and instantly executed remotely without using a dedicated program.

The present U.S. patent application claims the priority of Japanese Patent Application No. 2006-27037 filed on Feb. 3, 2006, according to the Paris Convention, and the above Japanese Patent Application is the basis for correcting mistranslation of the present U.S. patent application.

What is claimed is:

1. An output processing device, comprising:
a communication section which executes a communication with an external device;
an output section which executes a printout of stored data; and
a controller which creates data to be transmitted to the external device, the data including print instruction data, wherein a reply from the external device in response to the print instruction data transmitted thereto is substituted for an instruction on print execution of the stored data,
wherein the controller controls the communication section to distribute the print instruction data to the external device,
wherein the controller controls the output section to execute the printout of the stored data in response to reception of reply data included in the reply from the external device when the reply data to the distributed print instruction data is received through the communication section, and wherein instruction data for deleting the stored data can be added to the reply data, and when the reply data including the instruction data for deleting the stored data is received, the controller executes deletion of the stored data in accordance with the instruction data for deleting the stored data.

2. The output processing device of claim 1, wherein the controller creates the print instruction data including at least specific data for specifying printout object stored data and instruction data for print instruction on the stored data, and wherein when reply data including the specific data and the instruction data for the print instruction is received, the controller controls the output section to execute the printout based on the stored data specified by the specific data in accordance with the instruction data for the print instruction.

3. The output processing device of claim 1, wherein the device can set whether the print instruction data is distributed, and when the device sets the print instruction data to be distributed, the controller executes distribution of the print instruction data.

4. The output processing device of claim 1, wherein a distribution destination of the print instruction data can be specified, and wherein the controller controls the communication section to distribute the print instruction data to a specified distribution destination.

5. The output processing device of claim 1, wherein instruction data for setting a printing condition of the stored data can be added to the reply data, and when the reply data including the instruction data for setting the printing condition is received, the controller executes setting of the printing condition of the stored data in accordance with the instruction data for setting the printing condition.

6. An output processing method, comprising:

creating data to be transmitted to an external device, the data including print instruction data, wherein a reply from the external device in response to the print instruction data transmitted thereto is substituted for an instruction on print execution of stored data;

distributing the created print instruction data to the external device;

when reply data included in the reply from the external device in response to the created print instruction data distributed thereto is received, executing printing out of the stored data in response to reception of the reply data, and when instruction data for deleting the stored data has been added to the reply data and when the reply data including said instruction data is received, deleting the stored data in accordance with the instruction data.

7. The output processing method of claim 6, wherein in the creating, the print instruction data is created to include at least specific data for specifying printout object stored data and instruction data for print instruction on the stored data, and wherein in the printing out, when reply data including the specific data and the instruction data for the print instruction is received, the printing out based on the stored data specified by the specific data is executed in accordance with the instruction data for the print instruction.

8. The output processing method of claim 6, wherein it can be set whether the print instruction data is distributed, and in the distributing, when it is set that the print instruction data is to be distributed, distribution of the print instruction data is executed.

9. The output processing method of claim 6, wherein a distribution destination of the print instruction data can be specified, and in the distributing, the print instruction data is distributed to a specified distribution destination.

10. The output processing method of claim 6, wherein instruction data for setting of a printing condition of the stored data can be added to the reply data, and wherein the method further comprises setting the printing condition of the stored data in accordance with the instruction data for setting the printing condition when the reply data including the instruction data for the setting the printing condition is received.

* * * * *

UNITED STATES PATENT AND TRADEMARK OFFICE
CERTIFICATE OF CORRECTION

| | | |
|---|---|---|
| PATENT NO. | : 7,826,082 B2 | Page 1 of 1 |
| APPLICATION NO. | : 11/440949 | |
| DATED | : November 2, 2010 | |
| INVENTOR(S) | : Jun Kuroki | |

It is certified that error appears in the above-identified patent and that said Letters Patent is hereby corrected as shown below:

On the title page:

Under item (30) Foreign Application Priority Data;

Change "Mar. 2, 2006" to -- Feb. 3, 2006 --.

Signed and Sealed this
Fourteenth Day of June, 2011

David J. Kappos
*Director of the United States Patent and Trademark Office*